United States Patent
Galland et al.

[11] 4,000,107
[45] Dec. 28, 1976

[54] PLASTICIZED TERPOLYMERS OF VINYL CHLORIDE/VINYL ACETATE/HYDROXYALKYL ACRYLATE WITH GOOD METALIC ADHESION

[75] Inventors: Peter Michael Galland; Eugene Norman Skiest, both of Acton; Milton Kline, Leominster, all of Mass.

[73] Assignee: Borden, Inc., Columbus, Ohio

[22] Filed: Dec. 16, 1974

[21] Appl. No.: 532,956

[52] U.S. Cl. .............. 260/31.8 R; 260/31.8 G; 526/320

[51] Int. Cl.² ............... C08K 5/01; C08K 5/02; C08K 5/12; C08K 5/51

[58] Field of Search ...... 260/80.75, 31.8 R, 78.5 E, 260/78.5 CL, 80.81, 31.8 G; 526/320

[56] References Cited

UNITED STATES PATENTS

| | | | |
|---|---|---|---|
| 2,686,172 | 8/1954 | Wolf | 260/853 |
| 3,161,623 | 12/1964 | Kuhne | 260/80.75 |
| 3,269,994 | 8/1966 | Horn et al. | 260/80.75 |
| 3,554,953 | 1/1971 | Duchesneau et al. | 260/80.75 |
| 3,755,271 | 8/1973 | Montgomery | 260/80.75 |
| 3,826,669 | 7/1974 | Antlfinger et al. | 260/80.75 |
| 3,884,887 | 5/1975 | Montgomery | 260/80.75 |
| 3,884,887 | 5/1975 | Montgomery | 526/320 |

FOREIGN PATENTS OR APPLICATIONS

| | | | |
|---|---|---|---|
| 1,097,613 | 1/1968 | United Kingdom | 260/80.75 |

*Primary Examiner*—Allan Lieberman
*Attorney, Agent, or Firm*—George A. Kap; George P. Maskas; Daniel D. Mast

[57] ABSTRACT

This invention involves terpolymers of vinyl chloride, vinyl acetate and hydroxyalkyl acrylate wherein there is incorporated about 2.00 to about 5.5% by weight of the latter two monomers. These polymers provide efficacious protective coatings capable of forming a particularly effective adhesive bond to metallic substrates.

6 Claims, No Drawings ical adhesion is im-
PLASTICIZED TARPOLYMERS OF VINYL CHLORIDE/VINYL ACETATE/HYDROXYALKYL ACRYLATE WITH GOOD METALIC ADHESION

BACKGROUND OF THE INVENTION

Copolymers of vinyl acetate, vinyl chloride, and various acrylates have been known for some time as has their method of preparation. U.S. Pat. No. 1,933,052 discloses polymers which include the foregoing components in alternative combinations of components. The acrylic components and vinyl compounds are said however to be employed in equimolar proportions and in any event, in a percentage ratio which contains not less that 20% of acrylic or vinyl components. The patentee suggests employment of the foregoing compositions as intermediate layers for bonding mtals, wood, leather, and similar materials together. However, as the patentee notes, where smooth surfaces are to be coated, an initial layer of pure polymerized acrylic ester film is first applied to the smooth substrate before deposition thereon of a mixed polymerization product of the invention, which in a preferred embodiment is composed of 40% vinyl chloride and 60% acrylic methyl ester to provide an elastic intermediate layer over which is disposed a further copolymeric formulation of exclusively polymerized acrylic comonomers. This patent does not propose a formulation, useful in a single application, which will combine desired adhesive capability to smooth metallic surfaces with, at the same time, the protective properties afforded by and typical of vinyl chloride polymers and copolymers.

Other typical terpolymer compositions are disclosed in U.S. Pat. Nos. 3,017,396 and 3,370,050. The compositions described in U.S. Pat. No. 3,017,396 are terpolymers of vinyl chloride, vinyl acetate and alkoxyalkyl acrylate designed for use in vinyl floor tile and for employment in emulsion form for application to fabric, metal and wood to improve their resistance to attack by hydrocarbon solvents. This composition does not manifest any significant metal adhesive property and would not be employed characteristically where this property is a necessary qualification for its use since it contains the alkoxy group, as distinguished from hydroxy group which imparts metal adhesive property to the composition described herein.

U.S. Pat. No. 3,370,050 is directed to interpolymers of acrylate esters and relatively high-boiling vinyl compounds suitable for use in the solution polymerization procedures described therein. Excluded from the compositions of the patent, however, is that most utilitarian of components for use in flexible protective coating compositions, i.e., vinyl chloride, alone or in combination, illustratively, with vinyl acetate. Vinyl chloride would be incompatible with its polymer and thus inoperative in solution polymerization. The most nearly comparable monomer to vinyl chloride, at least structurally of those alluded to by the patentee, is allyl chloride, a compound which enters into copolymerization reactions by a chain transfer mechanism that tends to yield polymers of extremely low molecular weight and widely disparate physical properties from those wherein vinyl chloride is present.

Terpolymers of 86% vinyl chloride, 13% vinyl acetate and 1% maleic anhydride have been described in the *Encyclopedia of Polymer Science and Technology*, Vol. 14, p. 348, Interscience Publishers, New York, New York (1971) for use in lacquer applications where improved adhesion to metals is desired and reference is made additionally to substitution of acrylic or methacrylic acid for maleic anhydride. These products have not, however, satisfied demand for further improved products of this general character, due, in part, to their marked brittleness at depressed temperatures and their failure to secure the bond necessary in many instances. Furthermore, applications for resins, such as hydrolyzed polyvinyl acetate (i.e., polyvinyl alcohol), as a third component are limited since they have been utilized heretofore only in solution prime coats or adhesion promoters and have not been employed in plastisol or dry blend mixtures.

SUMMARY OF THE INVENTION

It is, accordingly, the primary object of this invention to provide an improved coating composition with excellent metal adhesion property.

It is a further object of this invention to provide an economically practicable, flexible, smooth, thermoplastic, protective film for metallic surfaces which manifests superior adhesive capacity after fusion without the use of an ecologically undesirable prime coat.

It is a further object of this invention to provide protective surface coating compositions having superior flow properties which may be applied by a variety of methods and in which inheres significant resistance to a broad spectrum of weathering conditions and attack by a wide span of industrial chemicals.

Other objects and advantages of this invention will become evident from the following description.

Accordingly, it has now been discovered that terpolymers of the monomers vinyl chloride, vinyl acetate and hydroxyalkyl acrylate, wherein the monomers are present in carefully circumscribed proportions, provide flexible films manifesting excellent adhesion to primed and, most significantly, unprimed metallic surfaces.

DESCRIPTION OF THE PREFERRED EMBODIMENTS

The thermoplastic resin films of the invention are those comprising, by weight, from 2.00% to 5.5% of hydroxyalkyl acrylate, and the remainder vinyl chloride and vinyl acetate. Significantly superior terpolymers for use in the practice of the invention are those in which there is present, by weight, 2.00 to 5.5% hydroxyalkyl acrylate, 2.00 to 5.5% of vinyl acetate and remainder of vinyl chloride. Hydroxyalkyl acrylates suitable for our purposes are those containing the lower alkyl groups and especially methyl, ethyl, propyl and butyl.

Particularly preferred terpolymers for use in the practice of this invention are those containing, by weight, 2.75% of hydroxyethyl acrylate, 2.75% vinyl acetate and 94.5% vinyl chloride. The foregoing proportions are based on the monomer charged in forming the desired copolymers. References appearing hereinafter to percentages shall, unless otherwise expressly indicated, refer to percentages by weight. The terpolymers of this invention have a relative viscosity in the range of 1.55 to 2.00, preferably from 1.65 to 1.75, measured at 25° C of 1% resin in cyclohexanone. When the relative viscosity is below 1.55, the resin does not have sufficient tensile strength whereas if a relative viscosity of 2.00 is exceeded, metallic adhesion is impaired.

The use of hydroxyalkyl methacrylates should be avoided in the terpolymers of this invention. When hydroxyethyl methacrylate was substituted for hydroxyethyl acrylate at the same level of 2.75%, the degree of flow-out imparted to films cast from dry-blend powders of the HEMA-containing terpolymers was so significantly poorer that this monomer was ruled out as a candidate.

The terpolymers of the invention are prepared by either standard suspension polymerization procedures in which the initial charge of hydroxyalkyl acrylate is introduced simultaneously with monomeric vinyl chloride and vinyl acetate in the proportions indicated to the reactor or by a delayed charge whereby the hydroxyalkyl acrylate is added after addition of the foregoing vinyl chloride and vinyl acetate components has been completed and the reaction temperature has been attained in the reactor vessel. Delayed addition of hydroxyalkyl acrylate improves the flow-out of the resulting resin.

In one standard embodiment, illustratively, polymerization is undertaken in a stirred autoclave at a temperature of about 45° C to about 70° C for a period of about 6 to 10 hours, and typically about 8 hours, under pressure sufficient to maintain the reactant in the liquid state. Where added separately, it is desirable to introduce the acrylate monomer about 2 to 3 hours and most desirably, about 2½ hours after introduction of the vinyl chloride and vinyl acetate.

The suspension medium is most desirably water, although inert organic liquids may be used so long as monomer and polymer are insoluble therein. The suspension medium usually constitutes from about 60 to 80% of the reaction mixture.

The polymerization initiators are those coventionally employed in vinyl polymerization procedures; for example, the azo initiators, the peroxydicarbonates, organic peroxides and hydroperoxides; and by way of further illustration, azobis-isobutyronitrile, isopropyl peroxydicarbonate, benzoyl peroxide, lauroyl peroxide, or the like. These initiators are normally incorporated in a concentration by weight of about 0.01 to 0.20% of the components incorporated in the reaction mix.

A suspending agent is usually incorporated in the suspension polymerization reaction mixture. Suitable agents are inorganic oxides, hydroxides and salts that are watersoluble and organic water-soluble polymers such as hydroxyethyl cellulose, methyl cellulose, gelatin, polyethylene oxides and metal salts of carboxymethyl cellulose. The purpose of the agent is to inhibit agglomeration of the reactant monomer in the partially formed polymer present in the polymerization mixture. The proportion of the suspending agent incorporated is that employed conventionally in the preparation of vinyl chloride-vinyl acetate copolymers.

The relative viscosity of the polymeric products of the invention is assured by inclusion in the polymerization reaction a chain-transfer agent such as, for example, trichloroethylene. The relative viscosity is critical within the range defined hereinabove in order to secure not only the desired flow-out of the resin in its application to a surface to be coated but, in addition, because it adds further efficacy to the metal adhesive properties of the terpolymer of the present invention. The chain-transfer agent is normally incorporated in the suspension system in an amount within the range of from about 1 to 4% and preferably about 2% by weight of the monomers charged.

The terpolymer is dewatered and dried by standard methods well known to those skilled in the art.

Resin particle size, geometry and absorptivity are determined by the level and/or type of suspending agent used as well as the speed of the reactor agitator. Particles of the adhesive blending resins, which may be used to make plastisols, have a glossy, regular, spherical surface and are of a particle size of 25 to 50 microns whereas the particles of the dry blend resins which are used in fluid bed and electrostatic spray applications should have a rough, irregular and porous surface. The particle size of the resin for fluid bed applications is in the range of 75 to 150 microns whereas resin used in electrostatic sprays has a particle size of 30 to 90 microns. In making the terpolymer resins for plasticols, agitation speed is relatively high and examples of suitable suspending agents are hydroxyethyl cellulose, methyl cellulose, gelatin, polyethylene oxide, and metal salts of carboxymethyl cellulose. In the case of dry blend resins, agitation speed is relatively low and the suspending agent is a mixture of polyethylene oxides and metallic soaps.

The terpolymers so prepared can be applied by a broad variety of means to a metallic, or indeed, other substrates, to provide bonded coatings of high degree of adhesion and permanence, including, for example, as plasticized dispersions in the form of plastisols or organosols, fluid bed dry blends, electrostatic sprays and solution coatings.

When employed in plasticized dispersions, the terpolymers prepared according to the invention are compounded with dispersion resins, plasticizers, heat stabilizers, and optionally, lubricants, pigments, flame retardants, ultra-violet radiation stablizers, antioxidants, antistatic agents, fungicidal components and the like in concentrations well known to those skilled in the art for use with polyvinyl chloride and vinyl chloride-vinyl acetate copolymers. The dispersion resins have a particle size on the order of 1 micron and may be either a polyvinyl chloride homopolymer or a vinyl chloride-vinyl acetate copolymer.

The plasticizers employed include the phthalates, phosphates, esters of aliphatic dibrasic acids and polyesters. Chlorinated paraffins as well as aliphatic and aromatic oils may also be included as extenders. The phthalates are preferred for their combination of properties and economy. Dialiphatic phthalates, such as di-isooctyl phthalate and di-2-ethylhexyl phthalate, esters of mixed $C_7$-$C_9$ alcohols, and for higher temperature end-use applications, e.g. above 60° C, di-tridecyl phthalate, are those normally used.

Illustrative of the other classes of plasticizers are tritolyl phosphate, dioctyl sebacate, dioctyl azelate, adipates and nylonates, as well as unmodified polyesters, e.g. poly (propylene sebacate), alcohol-modified polyesters and acid-modified polyesters.

The plasticizer is incorporated with the terpolymer in an amount by weight per 100 parts of vinyl-containing resin of about 35 to 150 parts. Where plastisols or electrostatic sprays are being compounded, the level of plasticizer incorporated will be normally within the range of 35 to 65 parts. Where dry blends are desired, the plasticizer will be employed at levels of about 35 to 100 parts.

Illustrative stabilizers include organolead compounds such as dibasic lead phthalate, basic lead carbonate, and dibasic lead phosphite; organotin stabilizers, such as dibutyl tin dimaleate, di-n-alkyltin mercaptides, and di-n-alkyltin dilaurates; and generally preferred, the long-chain aliphatic acid salts of cadmium and barium, most desirably in combinations of the two, such as barium and cadmium stearate. Barium phenoxide is also often included as well as zinc stearate or other zinc soaps in amounts ranging from one-eighth to one-third of the amount of weight of barium-cadmium soaps present. The various stabilizers, with the exception of the organotin stabilizers, are normally included in the resin in amounts of about 2 to 4% by weight of the resin, and most desirably 3%. The organotin stabilizers are normally utilized in amounts by weight of about 1 to 2%. Metallic salts based on strontium are also useful for this purpose. Where surface coatings are to be applied to food packaging, such as the interior lining of beer cans, use of lead or other toxic stabilizers is avoided.

Dry blends of the terpolymer suitable for use in the electrostatic spray or fluidized bed coating of articles are formulated as shown below:

| Electrostatic Spray Formulation | | |
|---|---|---|
| 100 parts | — | VCl/VAc/HEA |
| 40 " | — | dioctyl phthalate |
| 3 " | — | Ca - Zn stabilizer |
| 5 " | — | dry-up resin |

A plasticizer-stabilizer mixture is added to the resin and mixed in a high-shear mixer, suitably a Henschel Mixer. Mixing is continued with generation of internal heat, e.g. about 90° C to 120° C. The mixture, initially wet, is then dried via the addition of a dry-up resin to produce a free-flowing powder. Illustrative procedures for application of resin coatings by fluid bed techniques are discussed by T. H. MacEevan in *Plastics* (London), Vol. 29, pp. 109–111 (Feb. 1969). Electrostatic sprays also provide a useful means for applying the surface coating terpolymers of the invention.

The methods of application, whether in a plastisol, or by solution coating, fluidized bed or electrostatic spray, are well-known techniques to those skilled in the art.

The terpolymers of the invention are uniquely effective in forming a bond with metallic substrates such as steel, including galvanized and phosphatized steel and the like, and aluminum, copper and similar surfaces, smooth or rough, and forming a thin, coherent, protective film thereon, normally in a thickness of about 15 to 50 mils.

Laminates may also be formed using other substrates similar and dissimilar to those described hereinabove. The bonding of the resinous film to the substrate is normally effected at a temperature within the range of 300° F to 500° F and preferably from 350° F to 450° F; the period of time sufficient to effect fusion within these temperature ranges normally extends from 3 to 10 minutes.

The following examples are further illustrative of the invention. In these examples all parts and percentages are by weight unless otherwise expressly indicated.

EXAMPLE I

This example illustrates preparation of the terpolymer of the invention and control samples of other resins. Comparative metallic adhesion properties are tabulated and discussed.

To a standard 5-gallon reactor with a stirrer, containing 233% water, based on the weight of monomers, was added in each instance the comonomers indicated in Table I. The reactions were carried out at 400 revolutions per minute and 140° F to maximum conversion as indicated by a break in pressure. Each of the runs was catalyzed with 0.15% azo-bis-isobutyronitrile and stabilized with 0.7% hydroxyethyl cellulose plus 0.1% sodium lauryl sulfate.

Table I

| Monomer | Run 1 | Run 2 | Run 3 |
|---|---|---|---|
| Vinyl chloride (%) | 94.5 | 94.5 | 94.5 |
| Vinyl acetate (%) | 2.75 | 2.75 | 5.5 |
| Hydroxyethyl acrylate (%) | 2.75 | — | — |
| Acrylic acid (%) | — | 2.75 | — |
| Properties of Resulting Polymer | | | |
| Appearance | fairly regular | very regular | fairly regular |
| Particle size, microns | 14–28 | 7–14 | 14–28 |
| PAI (plasticizer absorption index in milliliters of dioctyl phthalate) | 76 | 98 | 72 |
| Relative viscosity | 2.02 | 1.97 | 1.95 |
| Metal adhesion | more adhesion than run 3 | more adhesion than runs 1 & 3 | least adhesive |

The metallic adhesion of the polymers of Runs 1, 2 and 3 was determined by sintering at 450° F a 32 mil coating of the foregoing polymers on a metal plate. The terpolymer of Run 1, reflecting the practice of the invention, and that of Run 2, in which acrylic acid was substituted for hydroxyethyl acrylate, manifested significantly greater adhesion than the comparable sample of Run 3, a vinyl chloride-vinyl acetate copolymer. Although the acrylic acid-containing terpolymer of Run 2 was somewhat superior to that of the hydroxyethyl acrylate-containing copolymer of Run 1, the incorporation of acrylic acid has the disadvantages of producing a film that cannot be cast uniformly, has poor flow-out, and exhibits poor heat stability.

EXAMPLE II

This example illustrates preparation of terpolymers of the invention and those of other vinyl-containing copolymers and the properties of each.

Resins were prepared by the method described in Example I using 0.15 percent azo-bis-isobutyronitrile as catalyst and a charge of 94.5% vinyl chloride monomer, 2.75% vinyl acetate monomer, 2.75% hydroxyethyl acrylate, and, in addition, 2.0% trichloroethylene, 0.7% hydroxyethyl cellulose, and 0.1% sodium lauryl sulfate, subject only to the variations otherwise indicated in Table II. Five pounds of the polymeric products compounded in proportions by weight of 100 parts of the individual polymer, 40 parts of dioctylphthalate and 3 parts of calcium-zinc containing stabilizer were introduced into a Henschel Mixer and mixed at high shear until a temperature of 195° F to 200° F was reached. The mixture was then cooled to 115° F. At this time, five parts of vinyl dry-up resin, also by weight of the total resin charged, was added to the mixture to absorb surface plasticizer and again the mixer was run at high shear to attain a temperature of 125° F to 130° F resulting in the production of a dry blend plasticized powder.

Samples of each lot run were cast on a 20 mil chromed plate at 50 mils dry and fused at 400° F for 4 minutes. The adhesion and smoothness of the films formed were evaluated with the results indicated in Table II.

Table II

| Run | Polymerization Variations | R.V. | PAI | Smoothness[1] | Adhesion[1] |
|---|---|---|---|---|---|
| 4 | None | 1.70 | 58 | 1 | 1 |
| 5 | Double vinyl acetate (5.5%) | 1.94 | 60 | 2 | 5 |
| 6 | 2.75% acrylic acid; no hydroxyethyl acrylate | 1.77 | 100 | would not cast | |
| 7 | Halve hydroxyethyl acrylate (1.37%) | 1.80 | 64 | 4 | 8 |
| 8 | no trichloroethylene | 2.00 | 76 | 9 | 4 |
| 9 | vinyl chloride homopolymer resin control | 1.62 | 84 | 8 | 9 |

[1]Numerical standard established on a basis of 1 to 10 in which the most satisfactory properties are designated by numeral 1 and the worst, by numeral 10.

It will be evident from Table II that where no comonomer is incorporated with vinyl chloride (Run 9), poor adhesion to the metallic substrate results. It will also be observed that where acrylic acid is incorporated as the third comonomer in place of hydroxyethyl acrylate (Run 6), the terpolymer could not be cast as a dry blend to provide a film, so that the property of smoothness and adhesion could not even be evaluated.

Interestingly, too, products inferior in smoothness of the film or coating formed, and of lessened, although acceptable, effectiveness as regards adhesiveness to metal resulted from terpolymers including percentages of hydroxyethyl acrylate, vinyl chloride and vinyl acetate within the confines of this invention but of a relative viscosity approaching 2.00. These comparatively high molecular weight polymers resulted from exclusion of the chain transfer agent, trichloroethylene, from the polymerization reaction (Run 8).

The test results both in adhesion and smoothness were attained with the terpolymer of the invention having a relative viscosity of 1.65 to 1.75 and with the preferred proportions of 2.75% of vinyl acetate and hydroxyethyl acrylate present, i.e., Run 4. Doubling the content of vinyl acetate (Run 5) to encompass the upper end of the range of this comonomer incorporated in accordance with the practice of the invention also resulted in a satisfactory product. Halving the content of hydroxyethyl acrylate, (Run 7) had a significantly adverse effect, however, particularly on the metal adhesive properties of the terpolymer. On the other hand, excessively high levels of the softening monomers, i.e., vinyl acetate and hydroxyethyl acrylate, deleteriously affect the tensile strength as well as the heat stability of the resulting film.

EXAMPLE III

This example illustrates properties of the terpolymer blending resins used in plastisol applications in contrast to those of a copolymer of vinyl chloride and vinyl acetate.

A plastisol test sample was prepared from a terpolymer coming within the scope of the present invention and formed from 94.5% vinyl chloride, 2.75% vinyl acetate and 2.75% hydroxyethyl acrylate. A plastisol constituting a control sample was also prepared from a resin composed of 94.5% vinyl chloride and 5.5% vinyl acetate. The resin employed in the control sample was produced in the manner described in Example I, Run 3. The resin of the test sample was identical to, and prepared as described in, Run 4 of Table II in Example II.

Plastisols of the foregoing resins were formulated by standard plastisol preparation techniques. The formulation contained 50 parts of polyvinyl chloride dispersion resin, 50 parts of test resin, 35 parts of dioctyl phthalate and 3 parts of barium-cadmium-zinc stabilizer.

A portion of the test and control samples of plastisol were drawn down at 40 mils wet on metal plates and fused at 350° F for 10 minutes. The fused portions of the samples were subjected to the standard Instron Pull Test with the results indicated below.

The Instron Pull Test employed in this and the subsequent examples involves adhesion of the strips 1¼ inches in width to a phosphatized steel panel from which they are peeled by an Instron unit employing the procedure of ASTM-D903-49.

Table III

| Sample | Instron Pull Test | Instron Strip Force (lbs. × 100/1¼ in. strip) | | | Average Pulling Force Per Sample |
|---|---|---|---|---|---|
| | | 1 | 2 | 3 | |
| Test (VCl/VAc/HEA) | Plate (a) | 36 | 41 | 41 | 39 |
| | Plate (b) | 41 | 43 | 46 | 43 |
| Control (VCl/VAc) | Plate (a) | 22 | 16 | 21 | 20 |
| | Plate (b) | 25 | 21 | 26 | 24 |

As seen from the results recorded in Table III, the metal adhesion properties of the plastisols are significantly enhanced by the use of the terpolymer of the invention.

EXAMPE IV

This example illustrates certain salient properties of the resins of the invention when employed as plasticized dry blends for application to a metal substrate in a conventional fluid bed system.

The terpolymer of the invention prepared from 94.5% vinyl chloride monomer, 2.75% vinyl acetate and 2.75% hydroxyethyl acrylate designated Test Resin in Table IV hereof; and a second control sample of vinyl chloride-vinyl acetate copolymer, produced from 94.5% of vinyl-chloride monomer and 5.5% vinyl acetate (referred to in Table IV as the "Control") were each compounded into a fluid bed dry blend formulation employing 100 parts of these resins with 3 parts organotin stabilizer, 70 parts dioctyl phthalate and 10 parts of vinyl dry-up resin. The resins were fused at 450° F and the related properties tested as shown in Table IV.

Table IV

| Resin Test Sample | Fusion Time Min. | Adhesion Instron Pull (lbs.) | R.V. | B.D. | PAI |
| --- | --- | --- | --- | --- | --- |
| Test Resin (VCl/VAc/HEA) | 2 | 1.40 | 1.98 | .32 | 115 |
|  | 4 | 2.70 |  |  |  |
| Control (VCl/VAc) | 2 | 0.32 | 1.91 | .39 | 132 |
|  | 4 | 0.72 |  |  |  |

It will be evident from the foregoing Table IV that the terpolymers of the invention manifested superior adhesion.

EXAMPLE V

Ths example presents comparative metal adhesion values for formulations containing only vinyl chloride homopolymer dispersion resin versus a composition containing a proportion of the vinyl chloride homopolymer in conjunction with our terpolymer.

The formulations herein were prepared as plastisols for use as an auto body sealant.

|  | Run A | Run B |
| --- | --- | --- |
| vinyl chloride homopolymer | 30 | 10 |
| adhesive resin of 94.5% vinyl chloride, 2.75% vinyl acetate and 2.75% hydroxyethyl acrylate | — | 20 |
| plasticizer | 30 | 30 |
| filler | 30 | 30 |
| stabilizer | 3 | 3 |

Plasticizer, filler and stabilizer noted above was the same for both runs. Results of adhesion to the same metal plate are given below:

|  | Run A | Run B |
| --- | --- | --- |
| adhesion in lbs/1¼" strip | 0.100 | 0.535 |

Adhesion test for Run B was re-run and the value obtained the second time was 0.600.

It will be evident that the practice herein described is applicable in a broad spectrum of media used in the relevant field and that the resins of the invention provide a variety of useful compatible compositions. Accordingly, it should be understood that the embodiments just described merely illustrate principles of the invention and that the terms and expressions which have been employed are used as terms of description and not of limitation. There is no intention in the use of these terms and expressions of excluding equivalents of the features shown and described or portions thereof and it is recognized that various modifications are possible within the scope of the invention claimed.

What is claimed is:

1. A thermoplastic resinous adhesive composition capable of forming a protective barrier for and adhering effectively to similar and dissimilar substrates comprising a resin plasticized with 35 to 150 parts of a plasticizer per 100 parts of the resin, said resin has a particle size of 25 to 150 microns, a relative viscosity of 1.55 to 2.00 measured at 25° C of 1% resin in cyclohexanone and is prepared from 2.00 to 5.5% by weight of hydroxyalkyl acrylate where the alkyl group contains from 1 to 4 carbon atoms, from 2.00 to 5.5% by weight of vinyl acetate, and from 96.0 to 89.0% by weight of vinyl chloride, the amounts being based on weight of monomers used in preparing said resin.

2. Coating composition of claim 1 wherein said monomeric components are incorporated in amount by weight of about 94.5% of vinyl chloride, about 2.75% vinyl acetate and about 2.75% of hydroxyalkyl acrylate.

3. Coating composition of claim 2 wherein said plasticizer is selected from phthalates and wherein said coating composition is formed for application as a solution, plastisol, dry blend or electrostatic spray.

4. Coating composition of claim 1 wherein said acrylate is hydroxyethyl acrylate and said resin has a relative viscosity of 1.65 to 1.75.

5. A flexible film-forming resin composition capable of adhering to metal substrates comprising resin plasticized with 35 to 150 parts of a plasticizer per 100 units of the resin, said resin having a relative viscosity of 1.55 to 2.00 measures at 25° C of 1% resin in cyclohexanone and a particle size of 25 to 150 microns, is a terpolymer polymerized from ingredients comprising 2.00 to 5.5% of hydroxyethyl acrylate, 2.00 to 5.5% of vinyl acetate and the remainder being vinyl chloride, the amounts being based on weight of monomers used in preparing said resin.

6. Resin of claim 5 having a relative viscosity of 1.65 to 1.75.

* * * * *